(12) United States Patent
Seymour et al.

(10) Patent No.: US 12,289,178 B2
(45) Date of Patent: Apr. 29, 2025

(54) BATH FILLING

(71) Applicant: Kohler Mira Limited, Gloucestershire (GB)

(72) Inventors: Christopher Laurence Seymour, Gloucestershire (GB); Alexander Colin Fagg, Gloucestershire (GB); Richard Harcourt Burns, Gloucestershire (GB); Karl Antony Fearnley, Gloucestershire (GB); Christopher John Duke, Gloucestershire (GB); Nigel Paul Sansum, Gloucestershire (GB)

(73) Assignee: Kohler Mira Limited, Cheltenham (GB)

(*) Notice: Subject to any disclaimer, the term of this patent is extended or adjusted under 35 U.S.C. 154(b) by 1005 days.

(21) Appl. No.: 16/510,025

(22) Filed: Jul. 12, 2019

(65) Prior Publication Data
US 2019/0334738 A1    Oct. 31, 2019

Related U.S. Application Data

(63) Continuation of application No. PCT/GB2018/050029, filed on Jan. 8, 2018.

(30) Foreign Application Priority Data

Jan. 13, 2017   (GB) ........................... 1700631

(51) Int. Cl.
| | | |
|---|---|---|
| H04L 12/28 | (2006.01) | |
| E03C 1/05 | (2006.01) | |
| H04L 67/125 | (2022.01) | |

(52) U.S. Cl.
CPC ......... H04L 12/2829 (2013.01); E03C 1/055 (2013.01); H04L 12/2814 (2013.01); H04L 67/125 (2013.01)

(58) Field of Classification Search
CPC ............ H04L 12/2829; H04L 12/2814; H04L 29/08567; H04L 12/2803; E03C 1/055; G05D 7/0617
See application file for complete search history.

(56) References Cited

U.S. PATENT DOCUMENTS

| 4,563,780 A | 1/1986 | Pollack |
| 4,923,116 A | 5/1990 | Homan |
| (Continued) | | |

FOREIGN PATENT DOCUMENTS

| CN | 201787733 | 4/2011 |
| CN | 203096840 | 7/2013 |
| (Continued) | | |

OTHER PUBLICATIONS

International Search Report re Application No. PCT/GB2018/050029; 2 pgs.

(Continued)

Primary Examiner — Alicia M. Choi
(74) Attorney, Agent, or Firm — Husch Blackwell LLP

(57) ABSTRACT

A control system for a bath includes one or more processors and one or more sensors. The one or more sensors are arranged to sense water flow parameter data as a user fills the bath and to transmit the water flow parameter data to the one or more processors. The one or more processors are arranged to determine water flow parameter values suitable for use to fill the bath based on the water flow parameter data, and store the determined water flow parameter values as a pre-set bath-fill option arranged to be used to automatically fill the bath for future use.

15 Claims, 3 Drawing Sheets

(56) References Cited

U.S. PATENT DOCUMENTS

| | | | |
|---|---|---|---|
| 6,029,094 A | 2/2000 | Diffut | |
| 2003/0141257 A1* | 7/2003 | Hammond | E03F 1/002 |
| | | | 210/764 |
| 2004/0261167 A1* | 12/2004 | Panopoulos | E04H 4/169 |
| | | | 4/490 |
| 2006/0186215 A1 | 8/2006 | Logan | |
| 2008/0271238 A1* | 11/2008 | Reede | A61B 5/0871 |
| | | | 4/597 |
| 2013/0175350 A1* | 7/2013 | Marks | G05D 23/1393 |
| | | | 236/12.12 |
| 2019/0104890 A1* | 4/2019 | Braddock | G01K 1/14 |

FOREIGN PATENT DOCUMENTS

| | | |
|---|---|---|
| CN | 103257660 | 8/2013 |
| CN | 204922156 | 12/2015 |
| CN | 105276821 | 1/2016 |
| CN | 205299968 | 6/2016 |
| CN | 205536565 | 8/2016 |
| GB | 2 534 358 | 7/2016 |
| WO | WO-02/02879 | 1/2002 |
| WO | WO2018/130811 | 7/2018 |

OTHER PUBLICATIONS

Search Report issued in British Application No. 1700631.3, dated Jul. 3, 2017.

* cited by examiner

BATH FILLING

CROSS-REFERENCE TO RELATED PATENT APPLICATIONS

The present application is a Continuation of International Application No. PCT/GB2018/050029, filed Jan. 8, 2018, which claim priority to and the benefit of United Kingdom Patent Application No. GB 1700631.3, filed Jan. 13, 2017. The entire disclosures of each of the foregoing applications are incorporated by reference herein.

This application is related to and incorporates by reference (but does not claim priority to) the following United Kingdom Patent Applications, each of which were filed on Jan. 13, 2017: GB 1700633.9; GB 1700636.2; and GB 1700630.5.

BACKGROUND

The invention relates to automated bath filling, and in particular to how a pre-set option for future automated bath fills is determined. More specifically, the invention relates to an apparatus, system and method for defining and storing parameters of a pre-set option for future use.

In the prior art, the automated filling of a bath tub to a desired depth and temperature is known (see, for example, U.S. Pat. No. 4,042,984 (A), American Bath and Shower). The bath tub is automatically filled with water of a pre-set temperature when a depth is manually entered.

SUMMARY

An exemplary embodiment relates to a control system for a bath that includes one or more processors and one or more sensors. The one or more sensors are arranged to sense water flow parameter data as a user fills the bath and to transmit the water flow parameter data to the one or more processors. The one or more processors are arranged to monitor temperature and amount of water during bath filling using the water flow parameter data; determine water flow parameter values suitable for use to fill the bath based on the monitored temperature and amount of water; and store the determined water flow parameter values as a pre-set bath-fill option arranged to be used to automatically fill the bath for future use.

Another exemplary embodiment relates to a controllable bathing apparatus that includes a bath, one or more processors, and one or more sensors. The one or more sensors are arranged to sense water flow parameter data as a user fills the bath and to transmit the water flow parameter data to the one or more processors. The one or more processors are arranged to monitor temperature and amount of water during bath filling using the water flow parameter data; determine water flow parameter values suitable for use to fill the bath based on the monitored temperature and amount of water; and store the determined water flow parameter values as a pre-set bath-fill option arranged to be used to automatically fill the bath for future use.

Another exemplary embodiment relates to a computer application for controlling filling a bath, the computer application being arranged to receive sensor data corresponding to water flow parameters as a user fills the bath; monitor temperature and amount of water during bath filling using the sensor data; determine water flow parameter values suitable for use to fill the bath based on the monitored temperature and amount of water; and store the determined water flow parameter values as a pre-set bath-fill option arranged to be used to automatically fill the bath for future use.

Another exemplary embodiment relates to a computer-implemented method of determining conditions for automated bath filling. The method includes receiving sensor data corresponding to water flow parameters as a user fills the bath; monitoring temperature and amount of water during bath filling using the sensor data; determining water flow parameter values suitable for use to fill the bath based on the monitored temperature and amount of water; and storing the determined water flow parameter values as a pre-set bath-fill option arranged to be used to automatically fill the bath for future use.

Another exemplary embodiment relates to a computer-implemented method of determining conditions for automated bath filling. The method includes, in a learning mode, receiving sensor data corresponding to water flow parameters as a user fills the bath; monitoring temperature and amount of water during bath filling using the sensor data; determining resultant bath conditions and water flow parameter values in line with the resultant bath conditions, based on the monitored temperature and amount of water; and storing a pre-set bath-fill option comprising the determined water flow parameter values, the pre-set bath fill option being arranged to be used to automatically fill the bath for future use based on the resultant bath conditions.

BRIEF DESCRIPTION OF THE DRAWINGS

There now follows by way of example only a detailed description of embodiments of the present invention with reference to the accompanying drawings in which.

DETAILED DESCRIPTION

Figure 1A:
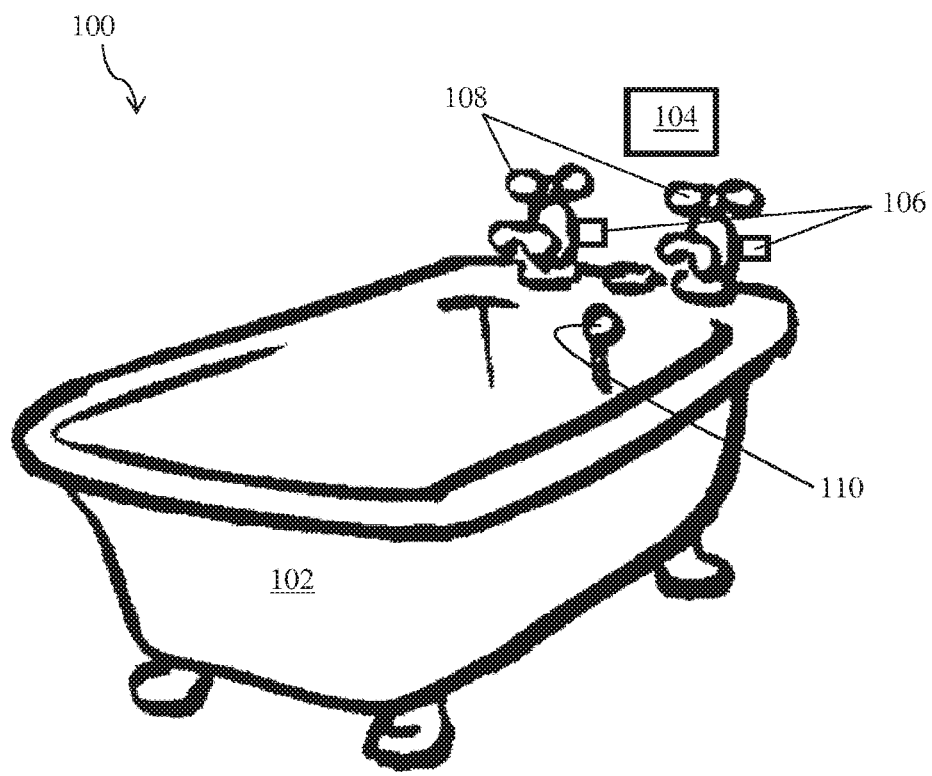
FIG. 1A is a schematic representation of a first controllable bathing apparatus.

According to a first aspect of the invention, there is provided a control system for a bath comprising one or more processors and one or more sensors. The one or more sensors are arranged to sense water flow parameter data as a user fills the bath and to transmit the water flow parameter data to the one or more processors. The one or more processors are arranged to (i) determine water flow parameter values suitable for use to fill the bath based on the water flow parameter data; and (ii) store the determined water flow parameter values as a pre-set bath-fill option arranged to be used to automatically fill the bath for future use.

According to a second aspect of the invention, there is provided a controllable bathing apparatus comprising a bath; one or more processors; and one or more sensors. The one or more sensors are arranged to sense water flow parameter data as a user fills the bath and to transmit the water flow parameter data to the one or more processors. The one or more processors are arranged to: (i) determine water flow parameter values suitable for use to fill the bath based on the water flow parameter data; and (ii) store the determined water flow parameter values as a pre-set bath-fill option arranged to be used to automatically fill the bath for future use.

According to a third aspect of the invention, there is provided a computer application for controlling filling a bath, the computer application being arranged to receive sensor data corresponding to water flow parameters as a user fills the bath; and determine water flow parameter values suitable for use to fill the bath based on the sensor data. The computer application then stores the determined water flow parameter values as a pre-set bath-fill option arranged to be used to automatically fill the bath for future use.

The computer may have a learning mode in which the computer application learns from how a user fills a bath to determine how the bath should be automatically filled in future, following the steps described above.

According to a fourth aspect of the invention, there is provided a computer-implemented method of determining conditions for automated bath filling. The method comprises (i) receiving sensor data corresponding to water flow parameters as a user fills the bath; (ii) determining water flow parameter values suitable for use to fill the bath based on the sensor data; and (iii) storing the determined water flow parameter values as a pre-set bath-fill option arranged to be used to automatically fill the bath for future use According to a fifth aspect of the invention, there is provided computer-implemented method or computer application for determining conditions for automated bath filling and having a learning mode. In the learning mode, the method or application receives sensor data corresponding to water flow parameters as a user fills the bath. It determines resultant bath conditions and water flow parameter values in line with the resultant bath conditions; and stores a pre-set bath-fill option comprising the determined water flow parameter values. The pre-set bath fill option being arranged to be used to automatically fill the bath for future use based on the resultant bath conditions.

Advantageously, in line with all five aspects of the invention, a pre-set option is therefore provided which can be selected by the user, or by a different user, in future to fill the bath according to the user choices demonstrated by the user's filling of the bath. The pre-set option is therefore tailored to the user's preferences, without requiring a user to know or guess a preferred depth or temperature and enter that manually.

The determined water flow parameter values used for the pre-set bath fill may be described as pre-set bath-fill water flow parameter values.

The pre-set option may fill the bath to the same volume, and/or depth, and temperature as the user did in the monitored bath-filling, i.e. it may replicate the original bath as filled by the user during the learning stage. In some embodiments, other conditions may be applied which cause the pre-set option to fill the bath differently; for example, taking into account an overflow risk and so reducing the total depth/volume, and/or keeping final temperature below a specified threshold to reduce the risk of scalding.

In the apparatus, control system, computer application or method of any aspect of the invention, a bath may then be automatically filled in line with the pre-set bath fill option on demand, for example by selection of that pre-set bath fill option via a menu or other control interface.

In the apparatus, control system, computer application or method of any aspect of the invention, the determining water flow parameters may comprise (i) monitoring the temperature and amount of water during bath filling using the water flow parameter data; and (ii) determining water flow parameter values suitable for use to fill the bath based on the monitored temperature and amount of water.

In the apparatus, control system, computer application or method of any aspect of the invention, the water flow parameter data may be used to calculate the temperature and amount of water in the bath after filling. Determining the water flow parameter values may therefore be performed by calculating water flow parameter values suitable for use to fill the bath to the calculated temperate and amount.

The water flow parameters may be one or more of flow rate, flow temperature and flow duration.

A single flow rate value, a single temperature value and a single flow duration value may be determined as the water flow parameter values, irrespective of how many times any of these parameters were varied by a user during filling the bath.

The flow parameter values may be selected for efficiency of water heating.

The flow parameter values may be selected to account for safety settings such as starting from full cold flow for a set period to reduce scald risk.

The amount of water may be one of depth and volume of the bath.

If a determined amount of water in the bath is above a threshold value, a set value may be used in place of the determined amount in the pre-set bath-fill option.

Advantageously, this may prevent overflow and/or wastage of water.

The determination of water flow parameter values may take into account one or more of the following:
    i. ambient temperature;
    ii. time of year;
    iii. material of the bath;
    iv. volume of the bath;
    v. overflow level of the bath;
    vi. performance characteristics of a water heating system arranged to heat the water supplied to the bath; and/or
    vii. safety settings.

The determination of water flow parameter values may comprise use of one or more look-up tables.

In the control system of the first aspect of the invention or the controllable bathing apparatus of the second aspect of the invention, the bath may have one or more taps and at least one of the one or more sensors may be located in, on or near the one or more taps. Further, all of the sensors may be located in or on the one or more taps and arranged to sense water flow parameter data of the water flowing through the one or more taps.

In the computer application of the third aspect of the invention or the method of the fourth aspect of the invention, the sensor data may be or include water flow parameter data.

The water flow parameter data may be or include water flow parameter data of the water flowing through: (i) one or more taps arranged to fill the bath; and/or (ii) one or more valves arranged to control water flow into the bath.

The skilled person would understand that features described with respect to one aspect of the invention may be applied, mutatis mutandis, to the other aspect of the invention.

Turning now to the accompanying drawings, the controllable bathing apparatus 100 shown in FIG. 1A comprises a bath 102, a control unit 104 comprising one or more processors, one or more taps 106 arranged to allow the bath 102 to be filled, and one or more sensors 108. In alternative embodiments, a single tap or more than two taps may be provided. In alternative or additional embodiments, the control unit 104 may be remote from the bath 102.

The sensors 108 are located in the taps 106. In alternative or additional embodiments, the sensors may be located on or near a valve through which the taps 106 are fed, and/or elsewhere. For example, water sensors and/or temperature sensors may be provided on or near the bath to detect bath depth, bath temperature and/or ambient temperature.

One or more of the sensors 108 are arranged to sense temperature of water flowing through the taps 106.

Flow rate and/or flow duration of water through the taps 106 is also monitored by the sensors 108; this may be done by monitoring tap position in some embodiments. In the embodiment being described, the sensors 108 include a clock or timer to measure flow duration at each flow rate and temperature, and/or total bath fill time.

In alternative or additional embodiments, the temperature of water flowing through the taps 106 is known or calculated from system parameters, meaning that no temperature sensor is necessary. In such embodiments, proportions of hot and cold water and/or run-time of the or each tap 106 is monitored and temperature of the resultant bath calculated from the available data.

Water temperature and flow rate, which may vary with time, and fill duration, which may be subdivided by other parameters, are all examples of water flow parameter data. The skilled person will appreciate that parameters such as volume and temperature of water in the resultant bath can be determined from these water flow parameter data; such values may also be classed as water flow parameter data and may be referred to as the determined bath volume/depth and the determined bath temperature. If the geometry of the bath 102 is known, bath depth can also be calculated.

In alternative or additional embodiments, one or more parameters such as depth or volume and temperature of water in the resultant bath are sensed directly instead of, or as well as, being calculated from indirect sensor measurements.

The data collected by the sensors 108, i.e. the sensor data, comprises water flow parameter data. Some or all of the sensor data is transmitted to the control unit 104.

The one or more processors within the control unit 104 determine water flow parameter values suitable for use to fill the bath based on the sensor data received from the sensors 108.

The determined water flow parameter values are then stored as a pre-set bath-fill option arranged to be used to automatically fill the bath for future use. In this embodiment, the pre-set bath fill option replicates the resultant bath conditions of the bath filled by the user in the learning mode.

A user can select the pre-set bath-fill option and the bath 102 is automatically filled in line with the water flow parameter values. The control unit 104 is arranged to control one or more valves and/or water heating systems so as to fill a bath 102 in line with the water flow parameter values in response to a user's selection of the pre-set option.

In alternative embodiments, the control unit 104 may comprise multiple electronic valves, or the likes, in direct electronic communication with the one or more processors.

Figure 1B:
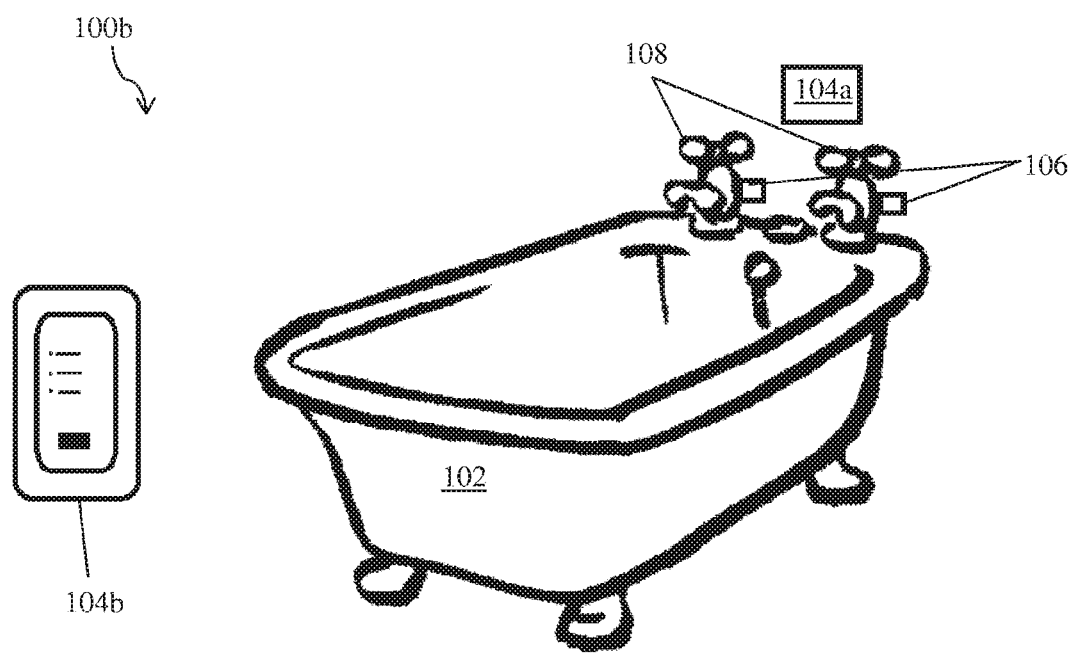
FIG. 1B is a schematic representation of a second controllable bathing apparatus.

The controllable bathing apparatus 100b shown in FIG. 1B is equivalent to that shown in FIG. 1A except that the one or more processors are contained within a user device 104b. Like reference numerals are used for like components. The one or more processors may therefore be remote from the controllable bathing apparatus 100/100b.

In the embodiment being described, the control unit 104a is arranged to send signals to the user device 104b, including signals relaying data from the sensors 108, and to receive signals from the user device 104b, including signals relating to control of the taps 106. In alternative or additional embodiments, the sensor data may be sent directly to the user device 104b.

Once stored, the pre-set bath-fill option can be selected via the user device 104b. Bath filling is therefore automated and can be triggered remotely. The control unit 104a is arranged to implement bath-fill instructions sent via the user device 104b, for example by controlling one or more motorized valves or the likes.

Multiple pre-set bath-fill options can be determined and stored. The pre-set bath-fill options are stored in a memory of one or more user devices 104b in the embodiment being described. In alternative or additional embodiments, the options may be stored in a memory of the control unit 104, 104a.

The skilled person will appreciate that, although different parts of the method 200 may be carried out in different devices and/or at different locations, the same overall method is applied for the controllable bathing apparatus 100 shown in FIG. 1A as for that 100b shown in FIG. 1B.

Figure 2:
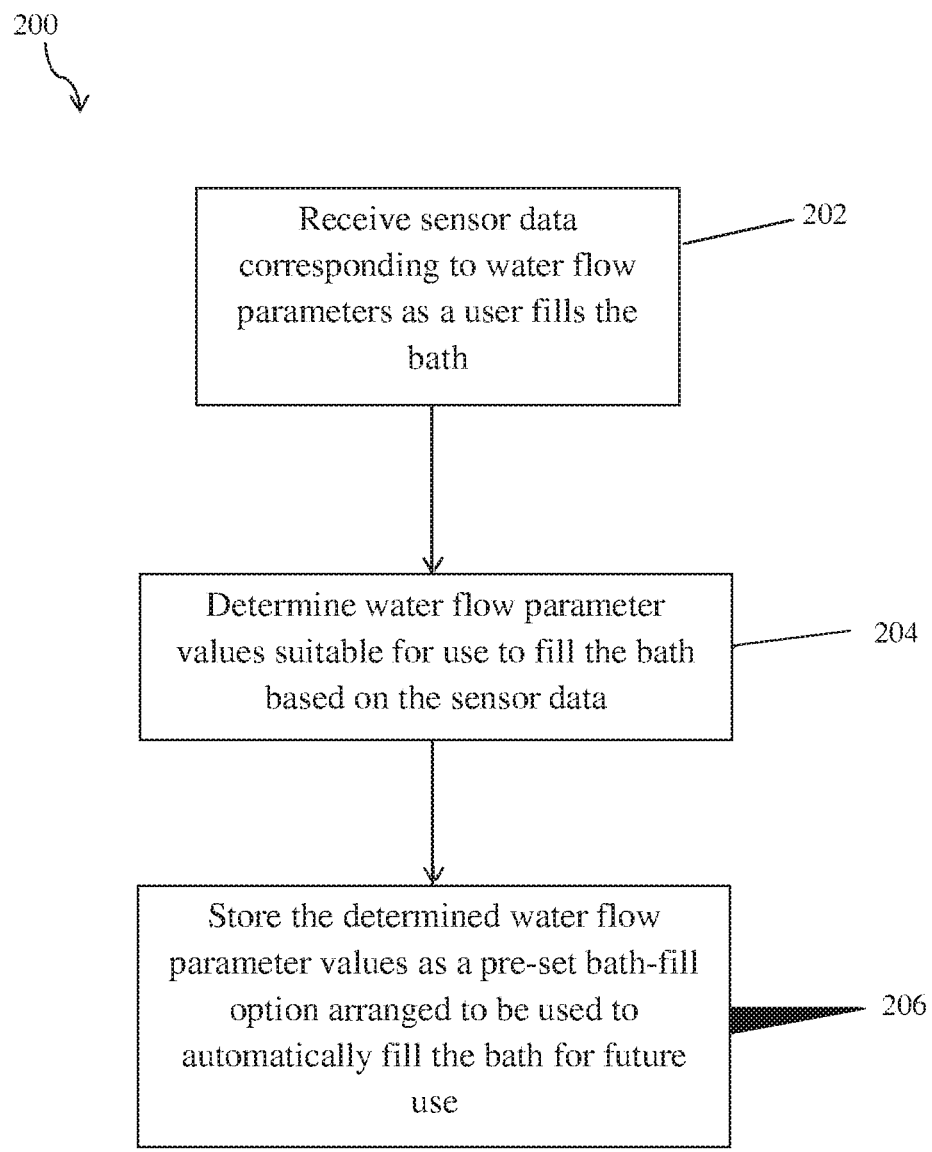
FIG. 2 shows a method for determining conditions for automated bath filling.

FIG. 2 provides a flow chart showing the method 200 described herein.

At step 202, sensor data corresponding to water flow parameters is received by the one or more processors as a user fills the bath 102.

Water flow parameter values suitable for use to fill the bath 102 are determined 204 based on the sensor data. In the embodiment being described, the determination 204 is performed once the bath filling is complete. In alternative or additional embodiments, the determination 204 may take place during bath filling, for example by performing time-averaging of data as the sensor data come in.

In the embodiment being described, the determination 204 is done by calculations performed by the one or more processors. In alternative or additional embodiments, the determination 204 may be done by use of one or more look-up tables. The look-up tables may be stored in a memory associated with the one or more processors, and/or elsewhere. For example, a user's device 104b may provide the processors, but the look-up tables (and optionally bath parameters such as material and capacity, which may or may not be part of the look-up tables) may be stored in a memory of the control unit 104a. The look-up tables may comprise data such as flow rate and/or flow temperature for each tap position, bath depth for a given total flow, bath properties and the likes.

In determining 204 the water flow parameter values, additional considerations are taken into account, including safety features and environmental factors.

In particular, the bath 102 has an overflow drain 110 at a fixed level. Any water above this level will flow out of the bath 102 via the overflow drain, or over the rim of the bath 102 if the bath level changes too quickly for the overflow drain 110 to accommodate the excess water. The one or more processors compare the amount of water in the bath 102 determined from the sensor data with the capacity of the bath 102. If the determined amount of water is greater than a predetermined threshold, the predetermined threshold is used in place of the determined amount. The predetermined threshold is smaller than the capacity of the bath 102, and results in a bath filled to below the level of the overflow drain 110 so as to allow for some water displacement when a user enters the bath 102. In alternative or additional embodiments, a set value for the amount of water different from the predetermined threshold is used when the predetermined threshold is exceeded.

Additionally, in some embodiments the control unit 104 is programmed to always start running a bath from a flow of cold water, for a set period, so as to reduce or eliminate the risk of scalds from hot water remaining in pipes leading to the taps 106.

In additional or alternative embodiments, either or both of these considerations may be ignored, and/or additional or alternative considerations may be taken into account. For example, flow rate, duration and/or temperature may be modified to account for a particular water heating system, so as to improve system efficiency and/or to reduce water wastage. In some embodiments, efficiency is optimized with respect to conditions including starting from a cold flow for a set time period for scald avoidance. Additionally or alternatively, one or more environmental factors which may affect rate of heat loss, and/or total heat loss, from the bath 102 may be factored in, for example bath material (as heat conductivity may vary significantly between ceramic and metal baths, for example), ambient temperature (which may be sensed by an additional networked sensor 108, or by a sensor 108 also arranged to detect flow temperature, before the water is turned on) and/or time of the year.

The determined water flow parameter values are then stored 206 as a pre-set bath-fill option arranged to be used to automatically fill the bath 102 in future. The pre-set bath-fill option may be stored in the control unit 104, 104a or on the user device 104b, or both.

The skilled person would appreciate that a control system 104, 104a, 104b, 108 arranged to implement the method described above may be provided separately from the bath 102, for example for retrofitting into a bath, as a software upgrade for bathing apparatus already having the required capabilities, and/or as an optional add-on for new installations.

The method 200 can be implemented using a computer application. The computer application may be run on a user's device 104b, and/or on a display associated with the control unit 104, 104a.

Figure 3:
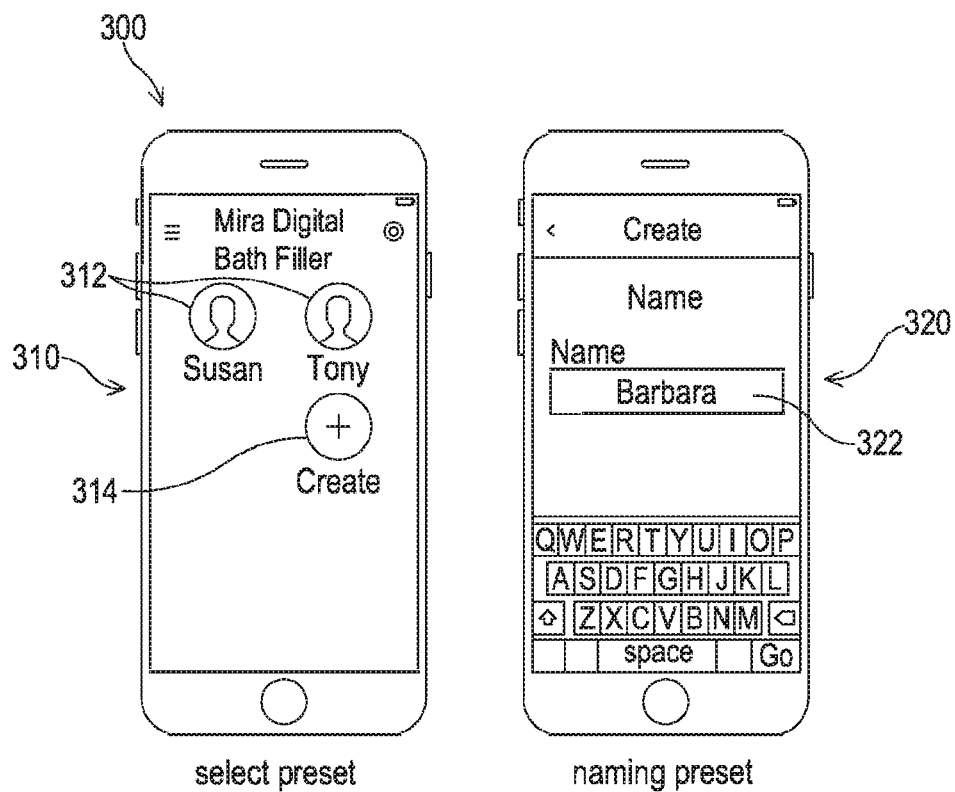
FIG. 3 shows schematic views of a computer application used to implement the method of FIG. 2.
Figure 3:
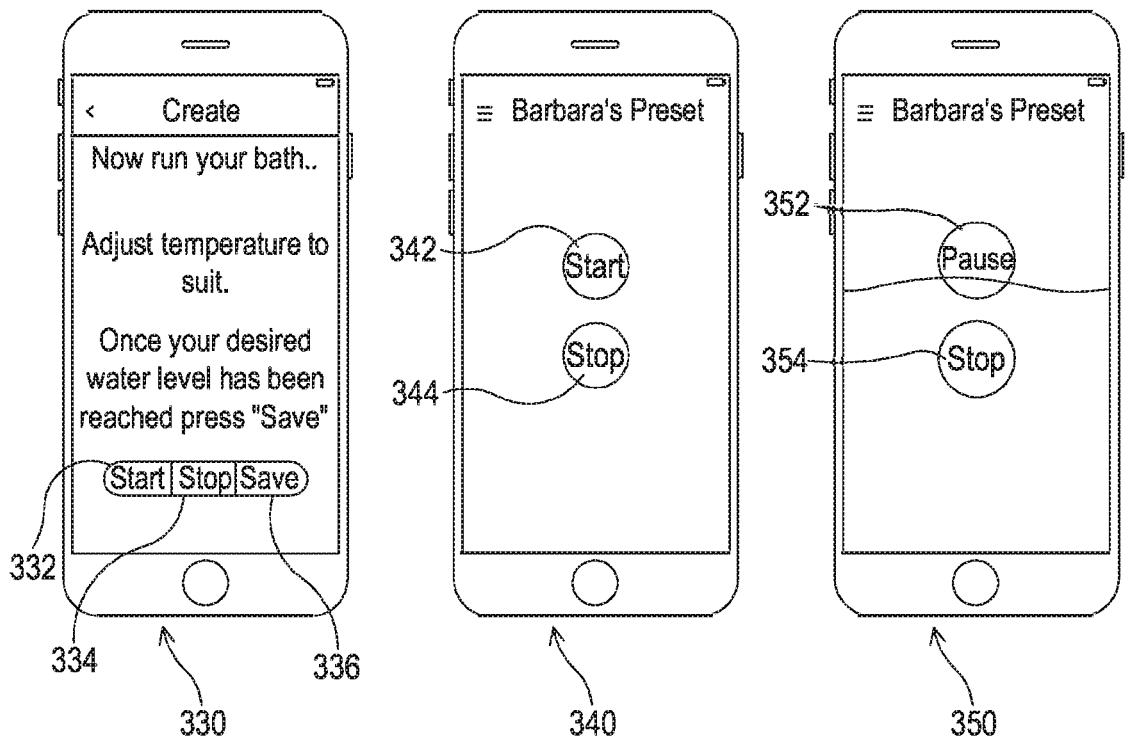

FIG. 3 shows a selection of screenshots 300 from a schematic example of such a computer application for use with a touch screen device 104b.

A first screenshot 310 shows a pre-set selection page with two stored pre-set bath-fill options 312 and a "Create" button 314 arranged to allow a user to define a new pre-set.

A second screenshot 320 shows a screen which is presented once the "Create" button 314 has been selected, in which a user is invited to name the new pre-set to be created by typing a name into the box 322 provided.

Once the name has been entered and confirmed, a prompt screen appears as shown by a third screenshot 330. The screen 330 shows instructions to a user to run the bath until the user is satisfied with the result, and to press "Save" once finished. Three buttons, "Start" 332, "Stop" 334 and "Save" 336, are displayed.

Once a user presses "Start" 332, the computer application enters a learning mode in which sensor data are processed to determine water flow parameter values which can be used to fill a bath 102 in accordance with the user choices made. The determined water flow parameter values may result in a bath of the same temperature and volume as that run by the user, or may differ for one or more of the reasons discussed above (for example, consideration of overflow risk).

Once the new pre-set bath-fill option is saved, a new option will appear on the screen shown in the first screenshot 310, allowing a user to select the new pre-set bath-fill option.

A fourth screenshot 340 shows the screen which appears once a pre-set bath-fill option is selected for use by a user. The screen 340 has two buttons, "Start" 342 and "Stop" 344.

When a user selects "Start" 342, the control unit 104 initiates filling of the bath 102 in line with the water flow parameter values saved for the selected pre-set bath-fill option.

A new screen is displayed once "Start" 342 has been selected, as shown by the fifth screenshot 350. The screen has two buttons, "Pause" 352 and "Stop" 354.

If a user selects "Pause" 352, filling of the bath 102 is interrupted and the "Pause" button 352 is replaced by a button labelled "Re-start". Filling resumes once "Re-start" is selected.

In alternative or additional embodiments, a timer (which may be provided by one or more of the sensors 108, by the control unit 104, 104a or a user's device 104b) may note the elapsed time whilst the filling is paused. The resumption of filling may take into account heat loss during the elapsed time and increase the temperature of the subsequent flow to make up for the heat loss.

If a user selects "Stop" 354, filling of the bath 102 is stopped and the computer application returns to the pre-set bath-fill option selection screen 310.

In alternative or additional embodiments in which a plug of the bath 102 is motorized and networked to the control unit 104, 104a or to the user device 104b, if a user selects "Stop" 354, filling of the bath 102 is stopped and the "Pause" 352 and "Stop" 354 buttons are replaced by "Drain bath" and "Return to Main Menu" buttons. Draining of the bath 102 can therefore be initiated via the application.

The skilled person will appreciate that these screenshots 300 are provided by way of example only and are in no way intended to limit the invention to the particular presentation and/or content shown. In particular, fewer, more or different user options may be presented, the interface may have a different layout and/or control means, and different graphics may be used.

The applicant's corresponding United Kingdom Patent Application No. GB 1700636.2, entitled "CONTROL OF BATHING APPARATUS" and filed on Jan. 13, 2017, the content of which is incorporated herein by reference, provides further details of optional features and functions of the computer application described herein.

The applicant's corresponding United Kingdom Patent Application No. GB 1700633.9, entitled "BATHING CONTROL SECURITY" and filed on Jan. 13, 2017, the content of which is incorporated herein by reference, provides further details of optional features and functions of the computer application described herein.

The applicant's corresponding United Kingdom Patent Application No. GB 1700630.5, entitled "MULTIPLE OUTLET SHOWER CONTROL" and filed on Jan. 13, 2017, the contents of which are hereby incorporated by reference, provides further details of optional features and functions of the computer application described herein.

What is claimed is:

1. A control system for a bath comprising one or more processors and one or more sensors in or on one or more taps for filling the bath, wherein:

the one or more sensors are arranged to sense water flow parameter data as the bath is automatically filled with water and to transmit the water flow parameter data to the one or more processors; and the one or more processors are arranged to:

monitor temperature and amount of water during filling of the bath using the water flow parameter data;

calculate water flow parameter values for use to fill the bath based on the monitored temperature and the monitored amount of water;

store the calculated water flow parameter values as a pre-set bath-fill option arranged to be used to automatically fill the bath for future use, wherein the calculation of the water flow parameter values takes into account an overflow level of the bath and at least one of a material of the bath or a capacity of the bath; and prevent overfilling of the bath beyond its capacity by controlling the one or more taps to automatically fill the bath below the overflow level of the bath based on the calculated water flow parameter values, wherein the calculation of water flow parameter values takes into account one or more of the following environmental factors:

i. ambient temperature;
ii. time of year;
iii. location; and
iv. performance characteristics of a water heating system arranged to heat the water supplied to the bath.

2. The control system of claim 1, wherein the control system is further arranged to fill the bath in accordance with the pre-set bath-fill option on demand.

3. The control system of claim 1, wherein the water flow parameter data are used to calculate a temperature and an amount of water in the bath after filling.

4. The control system of claim 3, wherein the calculating of the water flow parameter values is performed by calculating the water flow parameter values for use to fill the bath to the calculated temperature and the calculated amount of water.

5. The control system of claim 1, wherein the water flow parameter values are one or more parameters selected from a group consisting of flow rate, flow temperature, or flow duration.

6. The control system of claim 1, wherein a single flow rate value, a single temperature value and a single flow duration value are calculated as the pre-set bath-fill option water flow parameter values, and wherein the monitored temperature and the monitored amount of water vary during filling the bath.

7. The control system of claim 1, wherein the water flow parameter values are selected for efficiency of water heating.

8. The control system of claim 1, wherein the water flow parameter values are selected to account for safety settings, which comprise starting from full cold flow for a set period to reduce scald risk.

9. The control system of claim 1, wherein the amount of water is one of depth or volume of the bath.

10. The control system of claim 1, wherein, if a determined amount of water in the bath is above a threshold value, a set value is used in place of the determined amount of water in the pre-set bath-fill option.

11. The control system of claim 1, wherein the calculation of the water flow parameter values takes into account safety settings.

12. A computer-implemented method of determining conditions for automated bath filling, comprising:

in a learning mode, receiving, by one or more processors from one or more sensors arranged in or on one or more taps for filling the bath to sense water flow parameters, sensor data corresponding to the water flow parameters as a bath is automatically filled with water from one or more taps;

monitoring, by the one or more processors, temperature and amount of water during filling of the bath using the sensor data;

determining, by the one or more processors, resultant bath conditions based on the monitored temperature and the monitored amount of water during filling of the bath;

calculating, by the one or more processors, water flow parameter values based on the resultant bath conditions, wherein the calculation of the water flow parameter values takes into account an overflow level of the bath and at least one of a material of the bath or a capacity of the bath;

storing, by the one or more processors, a pre-set bath-fill option comprising the calculated water flow parameter values, the pre-set bath-fill option being arranged to be used to automatically fill the bath for future use based on the resultant bath conditions;

causing, by the one or more processors, filling of the bath using the calculated water flow parameter values responsive to receiving a selection of the pre-set bath-fill option; and preventing overfilling of the bath beyond its capacity by controlling the one or more taps to automatically fill the bath below the overflow level of the bath based on the calculated water flow parameter values, wherein the calculation of water flow parameter values takes into account one or more of the following environmental factors:

i. ambient temperature;
ii. time of year;
iii. location; and
iv. performance characteristics of a water heating system arranged to heat the water supplied to the bath.

13. The method of claim 12, wherein the sensor data are water flow parameter data of the water flowing through one or both of:

(i) one or more taps arranged to fill the bath; and
(ii) one or more valves arranged to control water flow into the bath.

14. A non-transitory computer readable medium storing instructions that, when executed by one or more processors, cause the one or more processors to:

receive, from one or more sensors arranged in or on one or more taps for filling the bath to sense water flow parameters, sensor data corresponding to the water flow parameters as is automatically filled a bath with water from the one or more taps;

monitor, based on the sensor data, temperature and amount of water during filling of the bath using the sensor data;

calculate water flow parameter values for use to fill the bath based on bath conditions based on the monitored temperature and the monitored amount of water, wherein the calculation of the water flow parameter values takes into account an overflow level of the bath and at least one of a material of the bath or a capacity of the bath;

store the calculated water flow parameter values as a pre-set bath-fill option arranged to be used to automatically fill the bath for future use based on the bath conditions;

cause filling of the bath using the calculated water flow parameter values responsive to receiving a selection of the pre-set bath-fill option; and prevent overfilling of the bath beyond its capacity by controlling the one or more taps to automatically fill the bath below the overflow level of the bath based on the calculated water flow parameter values, wherein the calculation of the water flow parameter values takes into account one or more of the following environmental factors:
i. ambient temperature;
ii. time of year;
iii. location; and
iv. performance characteristics of a water heating system arranged to heat the water supplied to the bath.

15. The non-transitory computer readable medium of claim 14, wherein the sensor data are water flow parameter data of the water flowing through one or both of:
(i) one or more taps arranged to fill the bath; and
(ii) one or more valves arranged to control water flow into the bath.

\* \* \* \* \*